US006085402A

United States Patent [19]

Hill, Jr.

[11] Patent Number: 6,085,402
[45] Date of Patent: Jul. 11, 2000

[54] METHOD OF REMOVAL AND INSERTION OF A BEARING INSERT FROM A SKATE WHEEL

[76] Inventor: William C. Hill, Jr., 4018 42nd Ave., N., St. Petersburg, Fla. 33714

[21] Appl. No.: 08/857,238

[22] Filed: May 16, 1997

Related U.S. Application Data

[62] Division of application No. 08/168,669, Dec. 16, 1993, which is a division of application No. 08/050,507, Apr. 20, 1993, Pat. No. 5,271,633.

[51] Int. Cl.[7] .................... B23P 19/00

[52] U.S. Cl. .................... 29/402.03; 29/402.08; 29/426.5; 29/280; 29/525; 29/724; 29/898.07; 29/898.08

[58] Field of Search .................... 29/278, 279, 280, 29/426.1, 426.5, 898.08, 270, 255, 724, 898.01, 898.07, 402.03, 402.08, 525

[56] References Cited

U.S. PATENT DOCUMENTS

| | | | |
|---|---|---|---|
| 1,506,258 | 8/1924 | Shaw | 29/280 |
| 1,516,189 | 11/1924 | Hebert | 29/280 |
| 1,536,553 | 5/1925 | Anderson, Jr. | 29/255 |
| 1,776,194 | 9/1930 | Leftwich | 29/255 |
| 1,851,116 | 3/1932 | Spiro | 29/278 X |
| 2,105,354 | 1/1938 | Hoerle . | |
| 3,309,155 | 3/1967 | Palmer . | |
| 3,837,662 | 9/1974 | Marks et al. . | |
| 3,945,104 | 3/1976 | Brookover, Jr. | 29/426.5 X |
| 4,034,995 | 7/1977 | Forward et al. . | |
| 4,666,168 | 5/1987 | Hamill et al. . | |
| 4,666,169 | 5/1987 | Hamill et al. . | |
| 4,940,342 | 7/1990 | Miyazawa et al. | 384/516 |
| 5,165,169 | 11/1992 | Boyce | 29/898.07 |

*Primary Examiner*—Joseph M. Gorski
*Attorney, Agent, or Firm*—Larson & Larson, P.A.; James E. Larson

[57] ABSTRACT

A method of removal and insertion of a bearing insert from a skate wheel is performed utilizing a bearing insert tool. The bearing insert has a central axial bore corresponding to the diameter of a central axial bore of a spacing element. An annular groove is formed on an inner circumference of the spacing element. The bearing insert tool has a shaft containing spring activated nipples on a distal end from a head portion. A button on the tool operates the spring. To remove a bearing insert the button is depressed retracting the nipples. The shaft is then inserted within the central axial bore of the bearing insert and spacing element. The nipples are released and allowed to engage the annular groove. Force is exerted in an axial direction away from the skate wheel causing the bearing insert and spacing element to be removed from the hub of the skate wheel.

8 Claims, 12 Drawing Sheets

METHOD OF REMOVAL AND INSERTION OF A BEARING INSERT FROM A SKATE WHEEL

PRIOR APPLICATIONS

This application is a divisional of Ser. No. 08/168,669, filed Dec. 16, 1993 which is a divisional of Ser. No. 08/050,507, filed Apr. 20, 1993, U.S. Pat. No. 5,271,633.

BACKGROUND OF THE INVENTION

1. Field of the Invention

This invention relates to bearing inserts for skates. More particularly, it relates to a method for removing and inserting a pair of ball bearing inserts from a hub of a wheel of in-line skates, roller skates, and skateboards.

2. Description of Prior Art

In-line skates, roller skates, and skateboards are well known and currently used by individuals for purposes of exercise and pleasure. In-line skates are additionally used in racing competition. Some examples of in-line skates are seen in U.S. Pat. Nos. 3,837,662, 4,034,995, 4,666,168, and 4,666,169.

Individuals who use in-line skates, roller skates, and skateboards for exercise and pleasure must keep their respective skates in good working order and must periodically replace worn out parts, such as wheels and bearings, so that the skate may continue to function properly. Individuals who race and compete using in-line skates must keep their skates in top working condition and are frequently forced to replace parts, such as wheels and bearings, during competition due to additional stress placed on the wheels and bearings during such competition. As bearings rotate, flaking of the metal balls and metal races occurs leaving small metal particles within the bearing. This flaking is accelerated in high stress performance use of the skate, such as competition.

The known in-line skates, roller skates, and skateboards do not have easily replaceable bearings to permit quick replacement of the bearings in the wheel. Bearings that are known and currently used in in-line skates, roller skates, and skateboards which are not quick release are shown in U.S. Pat. Nos. 2,105,354 and 3,309,155. Further, the known in-line skates are not equipped with alignment elements which would enable the skater to quickly drop in and align a wheel for rapid replacement. These two inadequacies cause a competitive skater to use too much time for repairs thereby resulting in either a loss or disqualification from a race. Individuals using skates for pleasure and exercise are forced to have their skates maintained by a repairman due to not having the proper tools to replace conventional bearings. In addition, known bearings used in skates utilize a spacing element between the pair of bearings in each respective wheel. This additional element is sometimes misplaced during replacement of the bearings thereby causing the wheel of a skate to not function.

There exists a need for a quick release bearing insert for in-line skates, roller skates, and skateboards. Additionally, there exists a need for a bearing insert incorporating the spacing element integrally into the bearing insert thereby eliminating the need for a separate spacing element. If the separate spacing element is to be used, there exits a need for a means to quickly align the separate spacing element. Further, it would be advantageous to incorporate and attach a reflective element to an outer surface of a skate wheel to brightly illuminate a skater, especially for use during twilight and night time hours. Still further, there exits a need for a method for removing and inserting bearing inserts from a skate wheel which employs a bearing insert tool.

SUMMARY OF THE INVENTION

I have invented an improved skate bearing insert which enables a skater to quickly remove and insert bearings in a wheel of an in-line skate, roller skate, and skateboard with minimal effort. I have provided a means for removing and replacing the bearing insert and/or a separate spacing element (if one is used) without touching the bearing insert or separate spacing element. Such means communicates with a bearing insert tool and constitutes an inventive method for removal and insertion of the bearing insert from and into the hub of the skate wheel.

My method functions with skate bearing inserts employing ball bearings positioned intermediate an outer and inner race. One bearing insert embodiment that functions with my method employs a bearing insert having an inner race with an integral extension of a second axial end abutting the integral extension of an opposed bearing insert of a respective second axial end when a pair of bearing inserts are inserted into a hub of a skate wheel. The integral extensions of the second axial ends of the pair of bearing inserts eliminate the need for a spacer between the two bearing inserts. An inner circumference of the inner race has an inner groove to engage with nipples of a bearing insert tool. The bearing insert tool has a shaft, a heard portion, the nipples on the shaft, and a finger grip portion. The bearing insert tool enables an individual to quickly remove and replace a bearing insert thereby eliminating the need for the individual to touch the bearing insert during such removal and replacement. Additionally, the bearing insert tool provides a means for cleaning the bearing insert without touching it.

A second bearing insert embodiment that functions with my method employs a pair of opposed bearing inserts that surround a separate spacing element when the bearing inserts and spacing element are inserted within a skate wheel hub. The spacing element and the bearing inserts generally have equal central axial bore diameters. An inner circumference within the central axial bore of the spacing element has an inner groove formed therein for engaging the nipples of the bearing insert tool.

Removal of either bearing insert embodiment is accomplished by inserting the shaft of the bearing insert tool into the central axial bore of one of the bearing inserts and/or spacing element. Spring controlled nipples along a distal end of the tool are retracted prior to insertion by depressing a button communicating with the spring. Release of the button allows the nipples to return to a relaxed state causing engagement of the nipples with the inner groove. Outwardly exerted axial force pulls the bearing insert and/or spacing element from the skate wheel hub.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
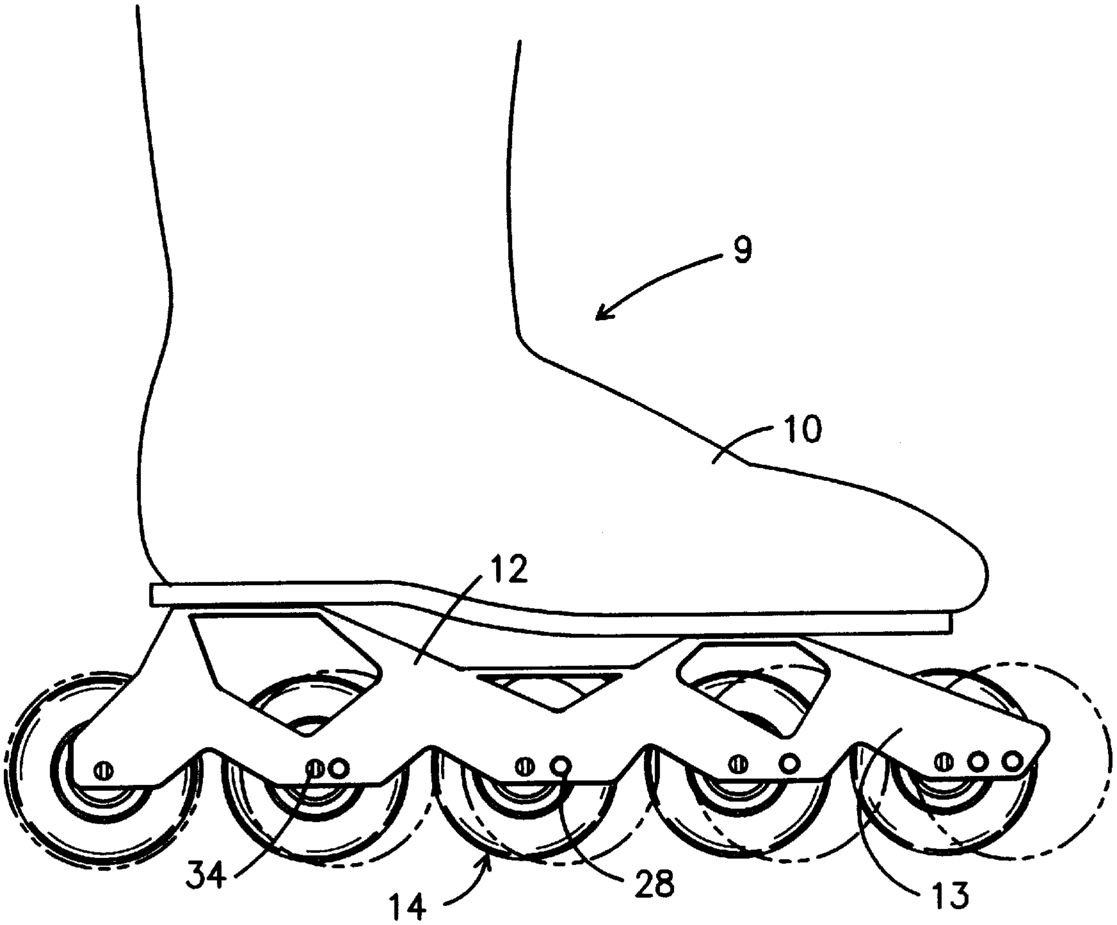
FIG. 1 is a side elevational view of an in-line skate housing with mounted wheels attached to a boot.

Throughout the following detailed description, the same reference numerals refer to the same elements in all figures.

Figure 3:
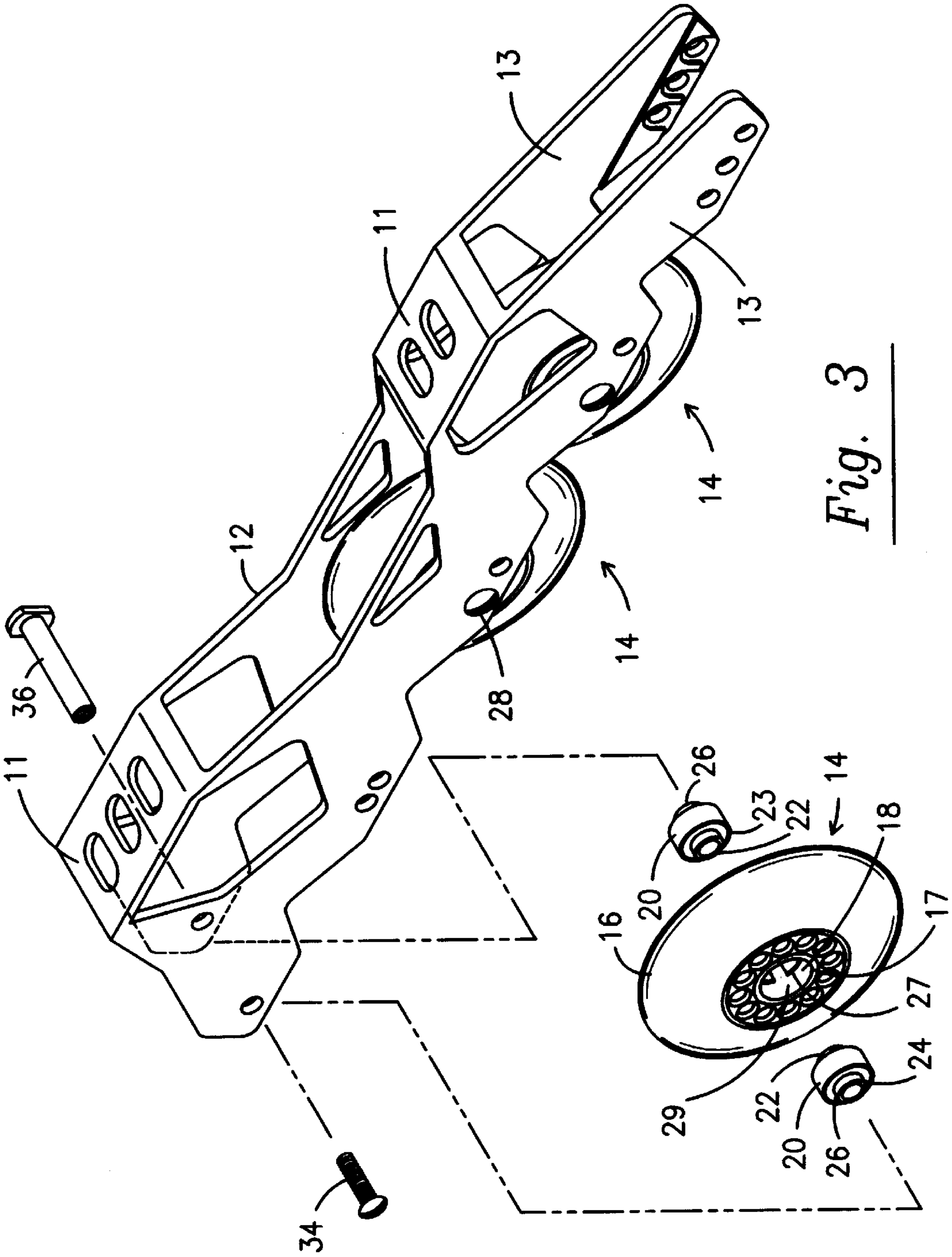
FIG. 3 is an exploded view of the in-line skate housing showing a skate wheel and pair of bearing inserts removed from a hub of the wheel.
Figure 6:
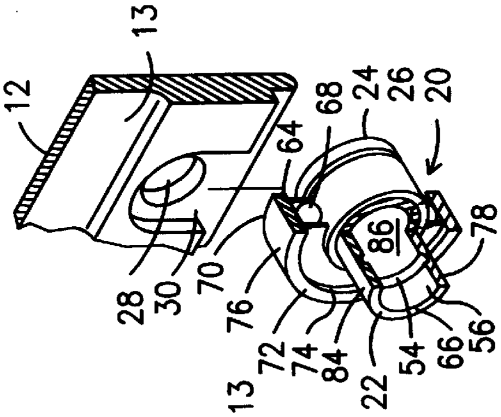
FIG. 6 is a sectional perspective view of a bearing insert about to be inserted into a pocket of the in-line skate housing.
Figure 18:
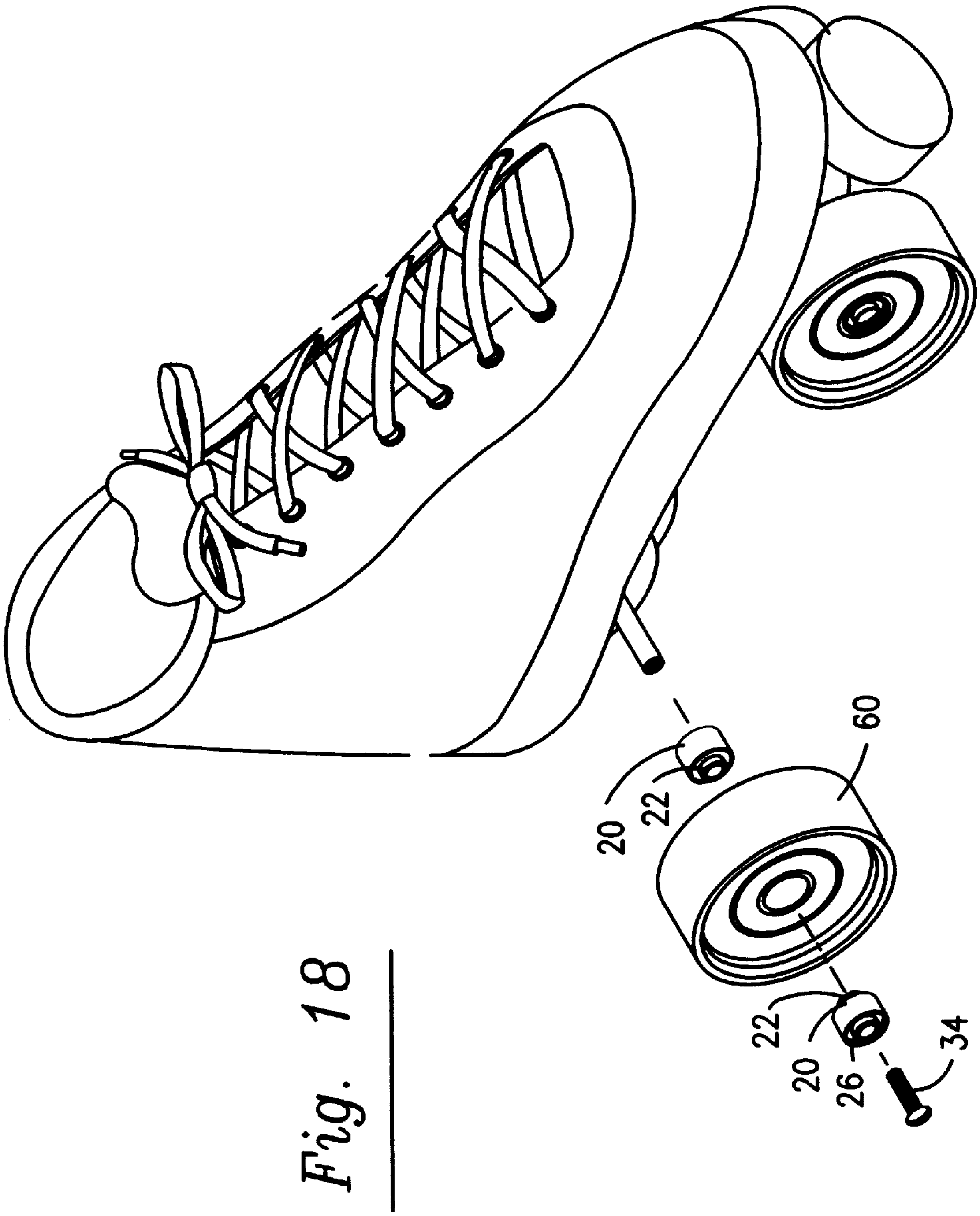
FIG. 18 is a perspective view of a roller skate with an exploded view of a roller skate wheel showing a pair of bearing inserts having integral extensions of second axial ends.
Figure 19:
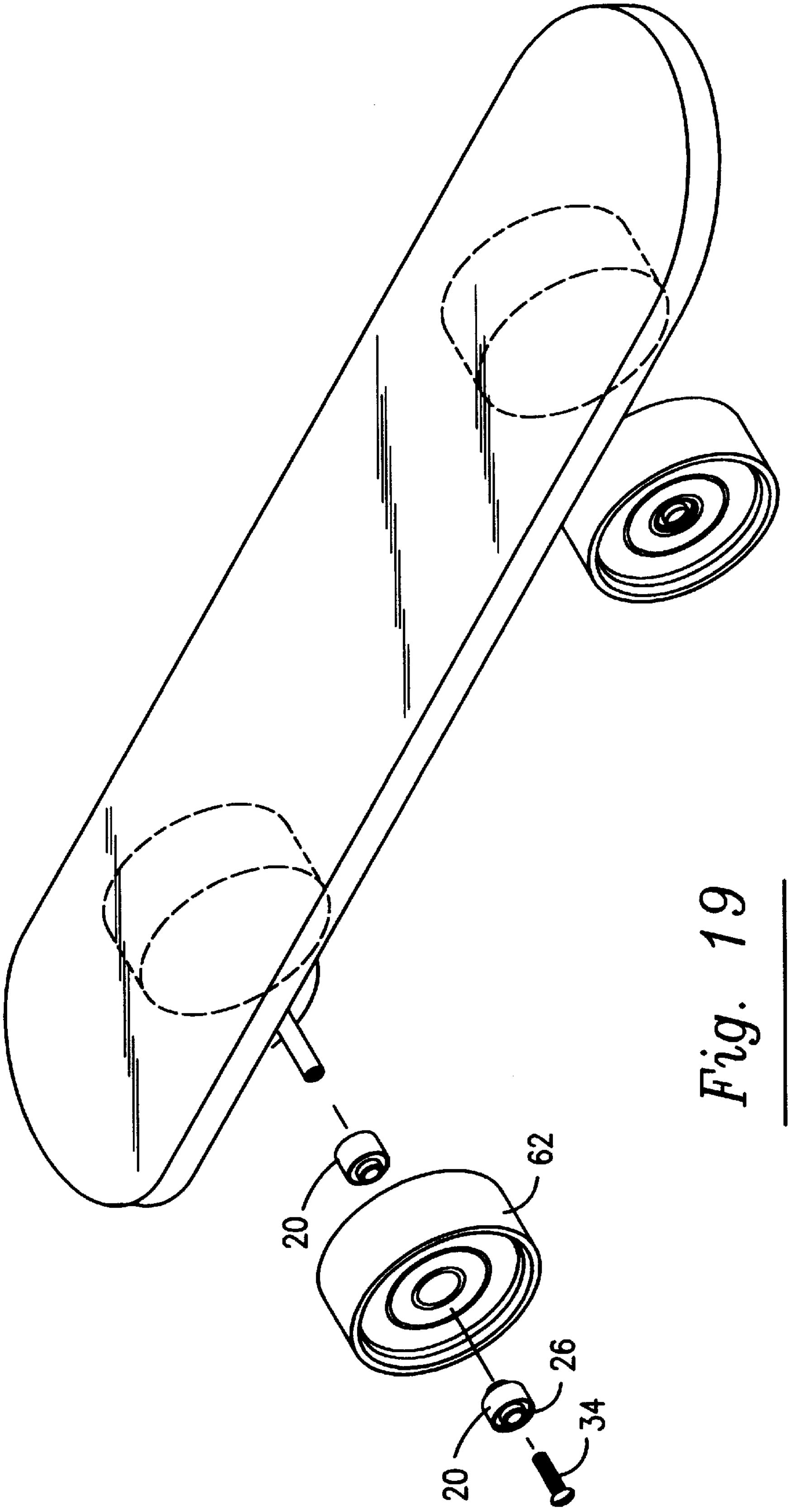
FIG. 19 is a perspective view of a skateboard with an exploded view of a skateboard wheel showing a pair of bearing inserts having an integral extensions of second axial ends.

A pair of bearing inserts 20 are inserted into a hub 17 of an in-line skate wheel 14 as shown in FIG. 3, a roller skate wheel 60 as shown in FIG. 18, or a skateboard wheel 62 as shown in FIG. 19. Bearing insert 20 has a cylindrical inner race 66, a cylindrical outer race 64 rotatable around inner race 66, a ball bearing positioner inserted between outer and inner races,, 64 and 66 respectively, and a set of ball bearings 68 inserted between outer and inner races, 64 and 66 respectively, as shown in FIG. 6. Ball bearings 68 are held in place by the ball bearing positioner.

Figure 5:
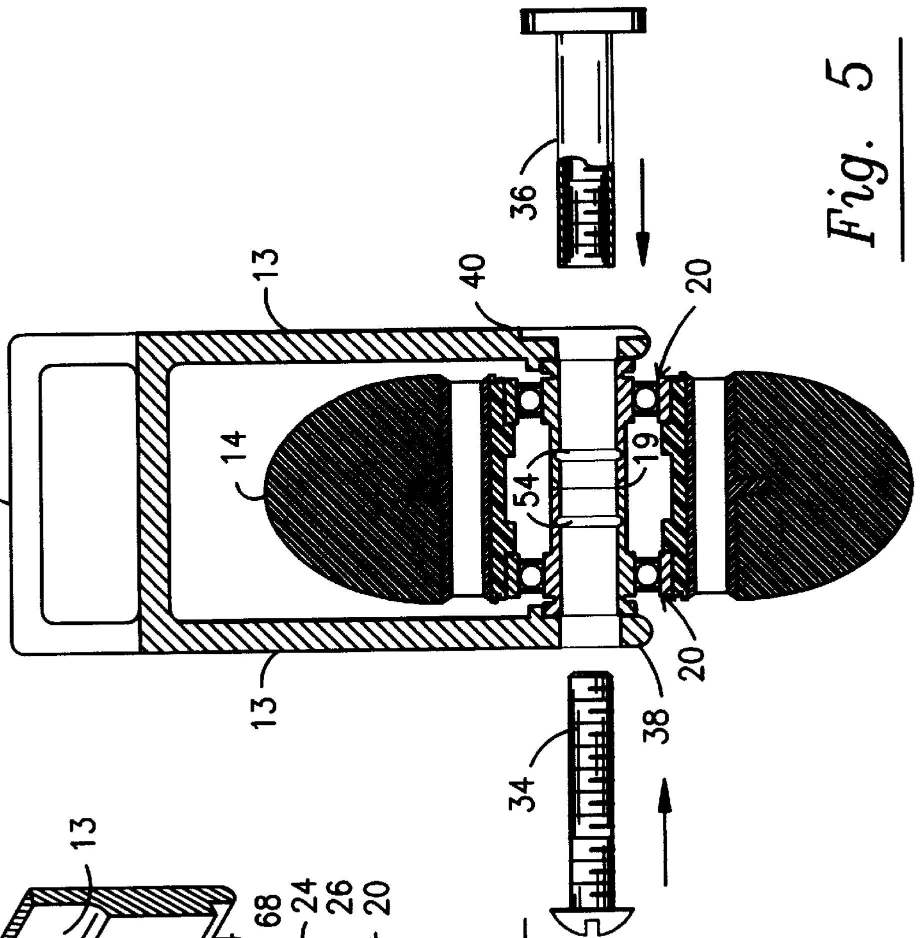
FIG. 5 is a sectional view of the in-line skate housing with the mounted wheel in a pocket along lines 4—4 of FIG. 2 with a bolt removed.
Figure 8:
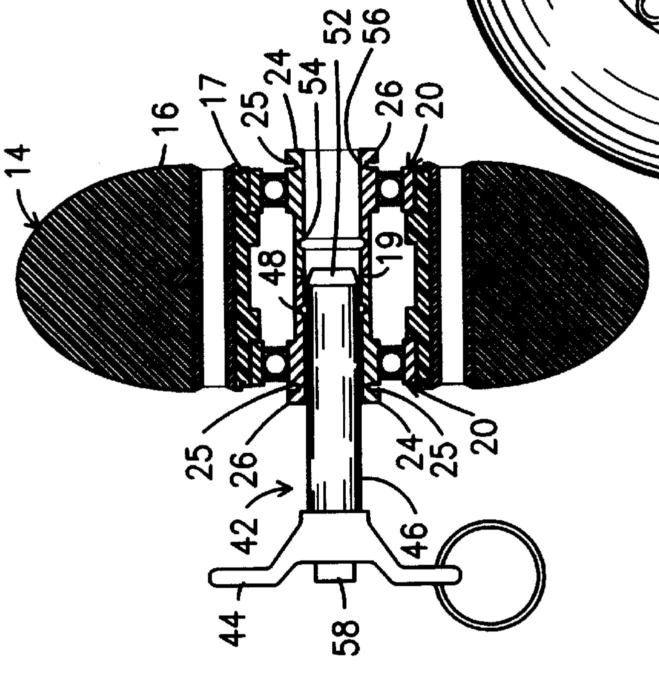
FIG. 8 is a sectional view of an in-line skate wheel along lines 8—8 of FIG. 7 with a bearing insert tool inserted into a bearing insert having an integral extension of a second axial end.
Figure 10:
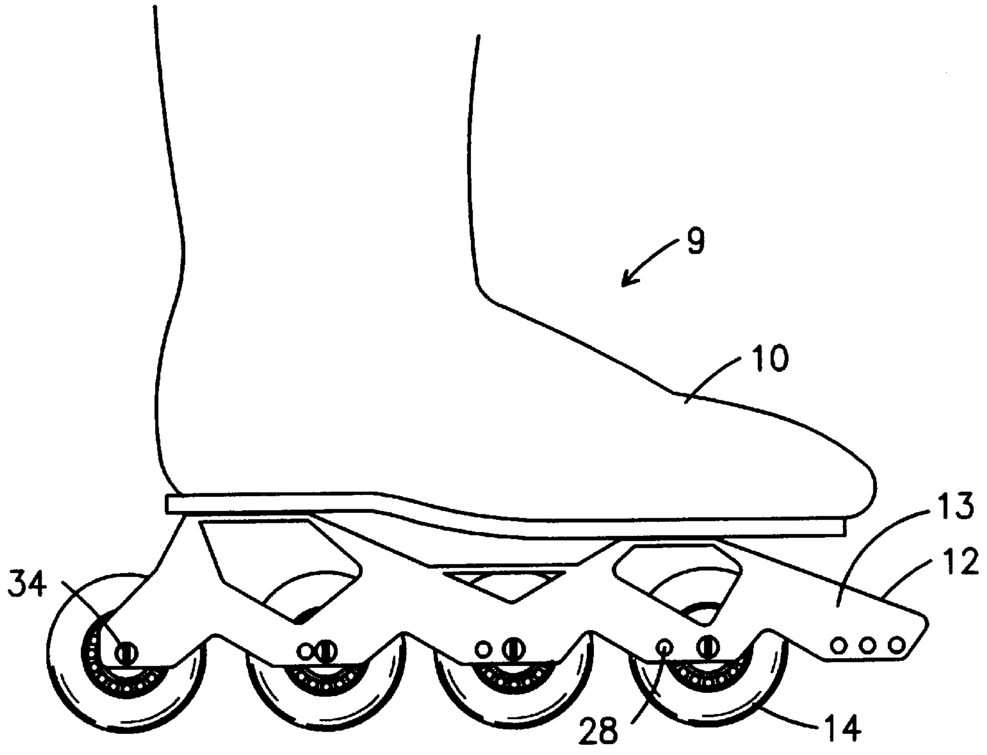
FIG. 10 is a side elevational view of the in-line skate housing showing an alternate in-line skate wheel configuration.
Figure 11:
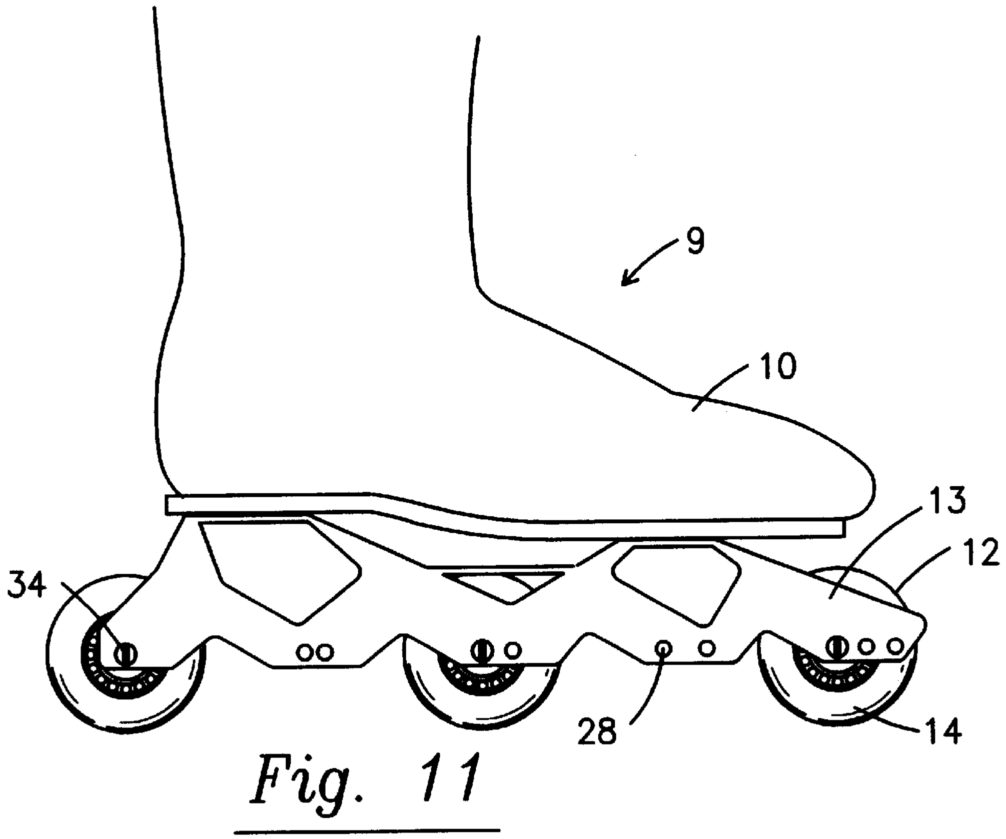
FIG. 11 is a side elevational view of the in-line skate housing showing a second alternate in-line skate wheel configuration.

Referring to FIG. 6, outer race 64 of bearing insert 20 has a first axial end 70, a second axial end 72, an inner circumference 74, and an outer circumference 76. Inner race 66 of bearing insert 20 has a first axial end 26, a second axial end 22, an inner circumference 56, an outer circumference 84, an integral cylindrical extension 78 of the second axial end 22, a central axial bore 86, and an annular inner groove 54 formed within central axial bore 86 along inner circumference 56. Integral extension 78 of inner race 66 of a pair of bearing inserts 20 abut at a middle portion 19 of hub 17 of skate wheel 14 when inserted into skate wheel 14 as shown in FIGS. 5 and 8.

Figure 16:
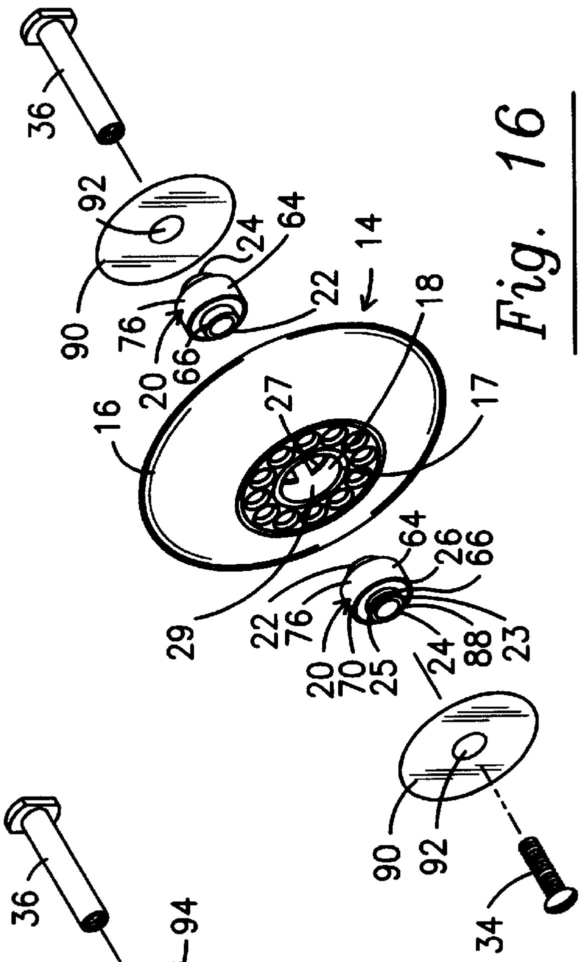
FIG. 16 is an exploded perspective view of an in-line skate wheel showing a pair of bearing inserts removed and a pair of reflective elements engagable with the bearing inserts along a groove on an outer circumference of an inner race of the bearing insert.
Figure 17:
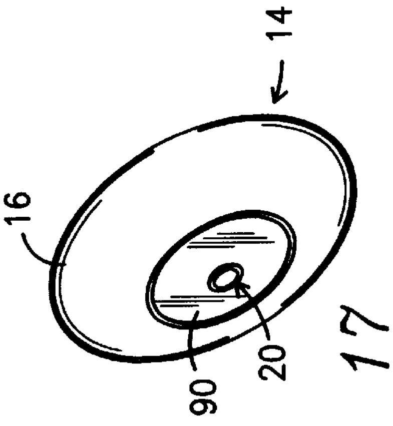
FIG. 17 is a perspective view of an in-line skate wheel showing a pair of bearing inserts inserted and a reflective element engaging the bearing insert along a groove on the outer circumference of the inner race of the bearing insert.
Figure 14:
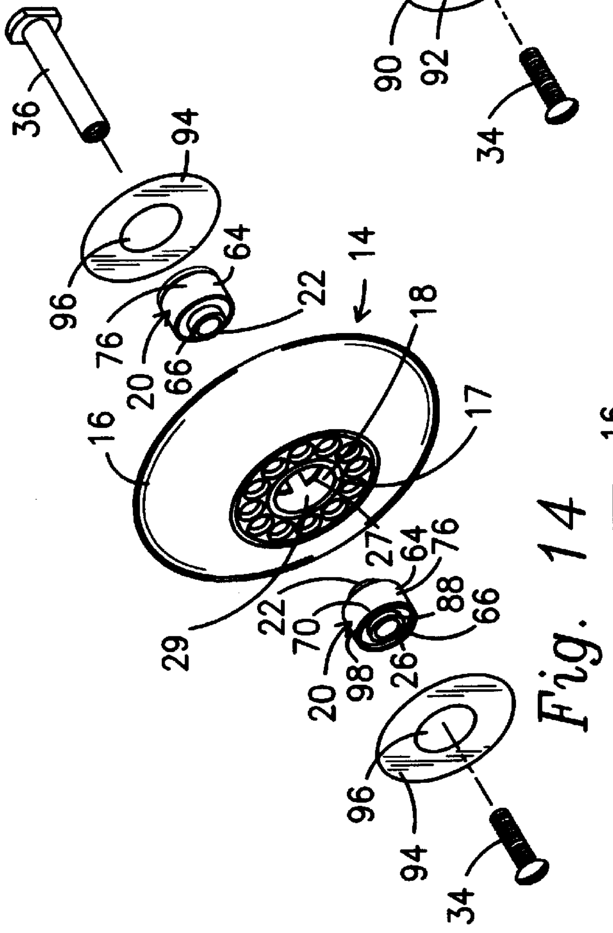
FIG. 14 is an exploded perspective view of an in-line skate wheel showing a pair of bearing inserts removed and a pair of reflective elements engagable with the bearing inserts along a groove on an outer circumference of an outer race of the bearing insert.

Referring to FIGS. 14 and 16, first axial end 70 of outer race 64 and first axial end 26 of inner race 66 define an outer surface 88 of bearing insert 20. Referring to FIGS. 16 and 17, a first reflective element 90 attaches to outer surface 88 of bearing insert 20. As shown in FIGS. 16 and 17, bearing insert 20 has a flange 24 integral with inner race 66 of first axial end 26 of inner race 66. Flange 24 has an outer circumference 23 with a first groove 25 formed in outer circumference 23. First reflective element 90 has a first annular opening 92 with a diameter corresponding to the diameter of first groove 25 in outer circumference 23 of flange 24. First annular opening 92 of first reflective element 90 engages first groove 25 of flange 24 thereby attaching first reflective element 90 to outer surface 88 of bearing insert 20. First reflective element 90 shown in FIGS. 16 and 17 is annular, although a first reflective element of a different shape could be employed to produce the same results.

Figure 15:
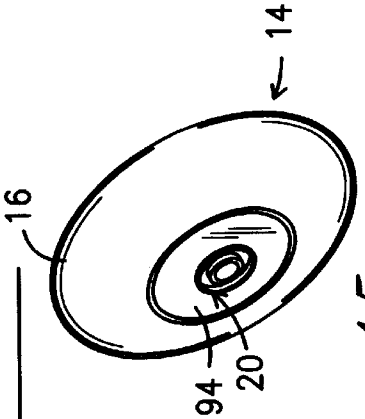
FIG. 15 is a perspective view of an in-line skate wheel showing a pair of bearing inserts inserted and a reflective-. element engaging the bearing insert along a groove on the outer circumference of the outer race of the bearing insert.

Referring to FIGS. 14 and 15, an alternate embodiment of an attachment of a second reflective element 94 is shown. A second groove 98 is formed in outer circumference 76 of first axial end 70 of the outer race 64. Second reflective element 94 has a second annular opening 96 with a diameter corresponding to the diameter of second groove 98 in outer circumference 76 of outer race 64. Second annular opening 96 of second reflective element 94 engages second groove 98 of outer race 64 thereby attaching second reflective element 94 to outer surface 88 of bearing insert 20. Second reflective element 94 shown in FIGS. 14 and 15 is annular, although a second reflective element of a different shape could be employed to produce the same results.

Figure 12:
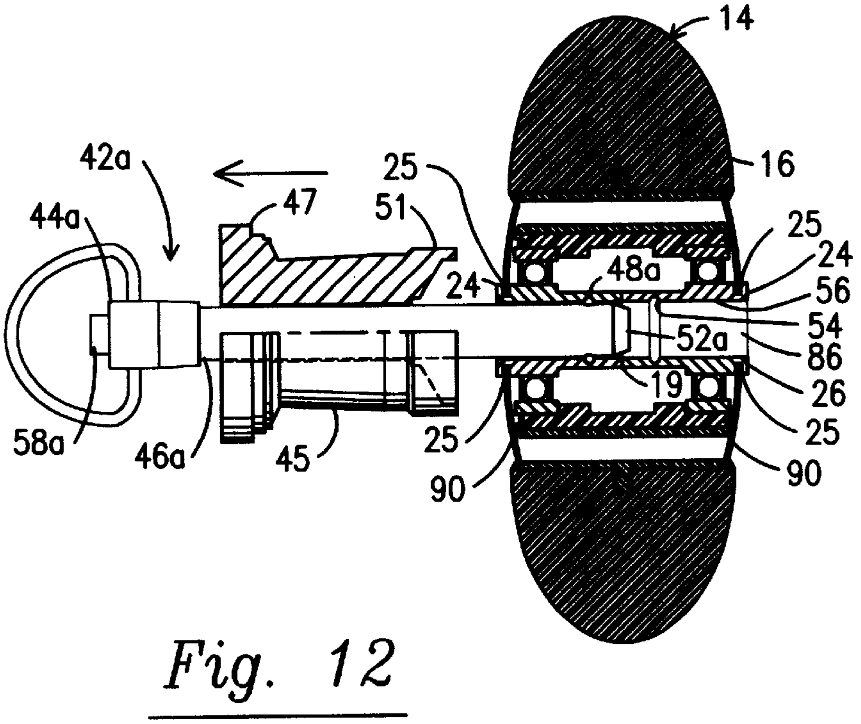
FIG. 12 is a sectional view of the in-line skate wheel along lines 8—8 of FIG. 7 with a bearing insert tool having a finger grip portion inserted over a shaft of the tool removing a bearing insert from an in-line skate wheel, the bearing insert having am integral extension of a second axial end.
Figure 13:
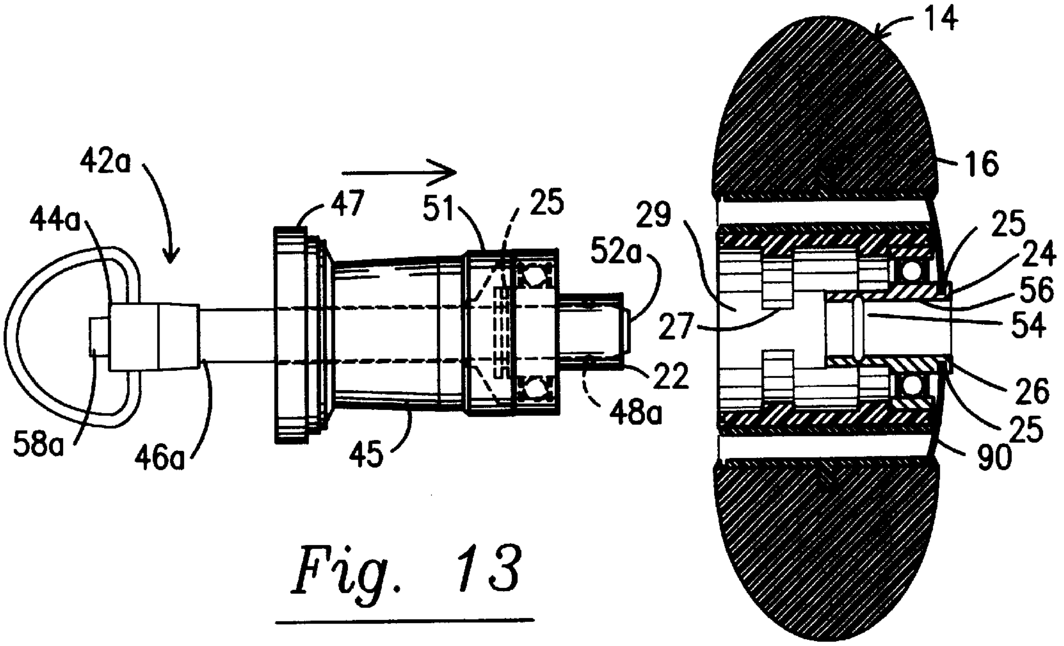
FIG. 13 is a sectional view of an in-line skate wheel along lines 8—8 of FIG. 7 with the bearing insert tool having the finger grip portion inserted over the shaft of the tool inserting a bearing insert into an in-line skate wheel, the bearing insert having an integral extension of a second axial end.

Bearing insert 20 is inserted and removed from hub 17 of skate wheel 14 utilizing a bearing insert tool 42*a,* as shown in FIGS. 12 and 13. Bearing insert tool 42*a* has a head portion 44*a,* a shaft 46*a,* nipples 48*a* located at a first distal end 52*a* to head portion 44*a*, a spring, not shown, enclosed within shaft 46*a*, a spring activation button 58*a* located in head portion 44*a*, and a finger grip 45 having a crown portion 47 and a diameter at a second distal end 51 to crown portion 47 corresponding to a diameter of outer circumference 76 of outer race 64 of bearing insert 20.

An individual removes bearing insert 20 from hub 17 of skate wheel 14 by depressing spring activation button 58*a*. Button 58*a* communicates with the spring which in turn retracts nipples 48*a*. Shaft 46*a* with nipples 48*a* retracted is inserted into central axial bore 86 of bearing insert 20. Spring activation button 58*a* is released allowing nipples 48*a* to engage inner groove 54 formed along inner circumference 56 of inner race 66 within central axial bore 86. The individual positions at least two fingers under crown portion 47 of bearing insert tool 42*a*. Tool 42*a* with the engaged bearing insert 20 is pulled in an axial direction away from skate wheel 14 thereby removing bearing insert 20 frame hub 17 of skate wheel 14.

If bearing insert 20 is going to be reused, it is advantageous to remove any dust, sand, grit, or flake particles inside bearing insert 20 which are present after using the bearing insert in skate wheel 14. Bearing insert 20 is submerged into a cleaning solution of gasoline, methylethylketone, or acetone to strip and clean the bearing insert 20, thereby removing any dust, sand, grit, or flake particles. Bearing insert 20 is removed from the cleaning solution and submerged in a rinsing solution of water. Bearing insert 20 is removed from the rinsing solution and allowed to dry. Mineral oil or light grade oil is applied to ball bearings 68. The entire cleaning process is completed without disengaging bearing insert tool 42*a* from bearing insert 20, although the cleaning process can be completed by disengaging bearing insert tool 42*a* from bearing insert 20.

To replace bearing insert 20 into skate wheel 14, bearing insert 20, engaged with bearing insert tool 42*a*, is inserted into hub 17 of skate wheel 14. The individual positions second distal end 51 of finger grip 45 over outer race 64 of bearing insert 20, positions at least two fingers on finger grip 45 of bearing tool 42*a*, and pushes on bearing insert 20 in an axial direction towards skate wheel 14. Spring activation button 58*a* is depressed, retracting nipples 48*a* from inner groove 54. Bearing insert tool 42*a* is pulled in an axial direction away from skate wheel 14, thereby removing shaft 46*a* of bearing insert tool 42*a* from central axial bore 86 of bearing insert 20. Spring activation button 58*a* is released allowing the spring to return to a relaxed state.

The entire removal, cleaning, and insertion process of bearing insert 20 has been completed without the individual touching the bearing insert. It is advantageous to minimize contact with the compounds applied to bearing insert 20 as well as those used in the cleaning process.

Figure 20:
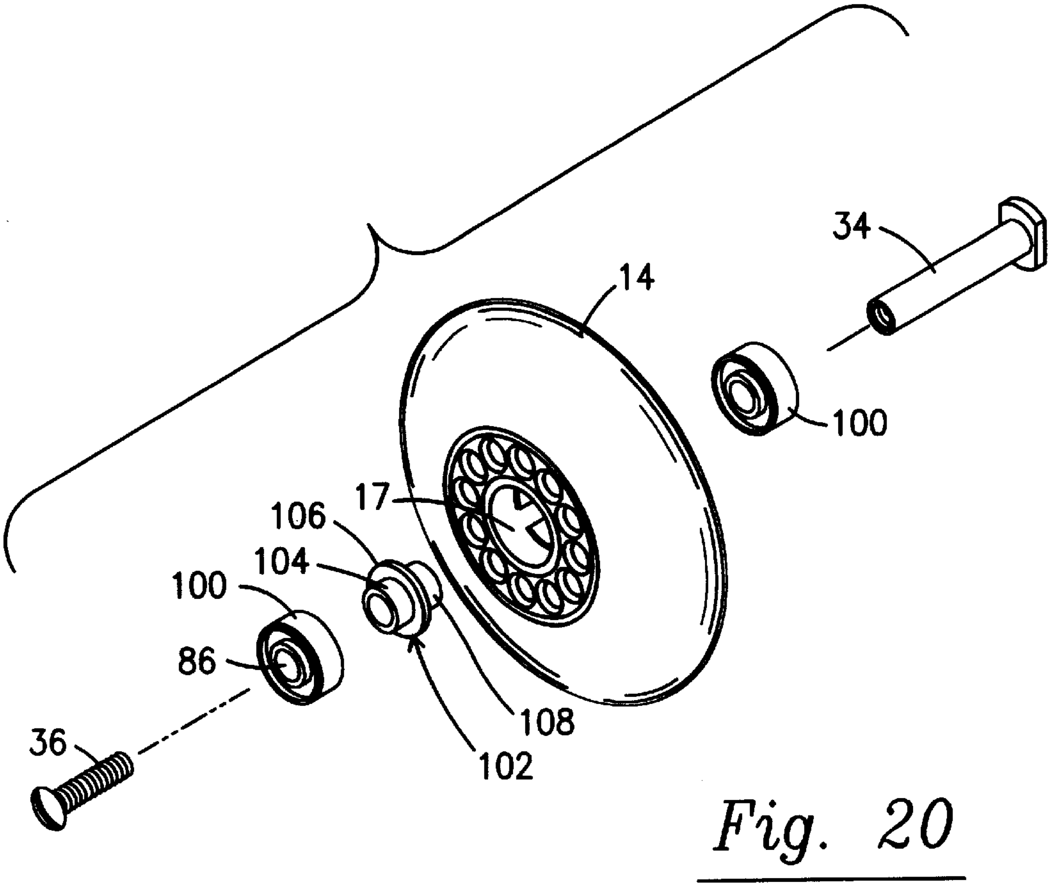
FIG. 20 is an exploded view of an in-line skate wheel employing a pair of bearing inserts and a separate spacing element.
Figure 21:
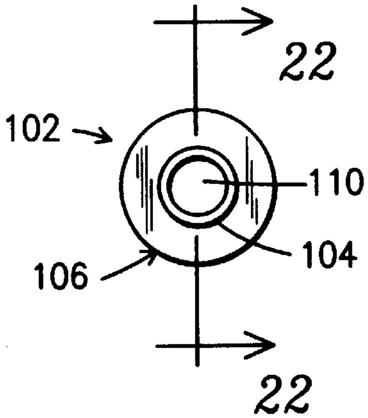
FIG. 21 is a side elevational view of a spacing element employed in the method of the present invention.
Figure 22:
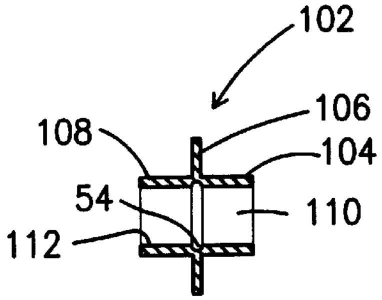
FIG. 22 is a cross sectional view of the spacing element along lines 22—22 of FIG. 21.
Figure 23:
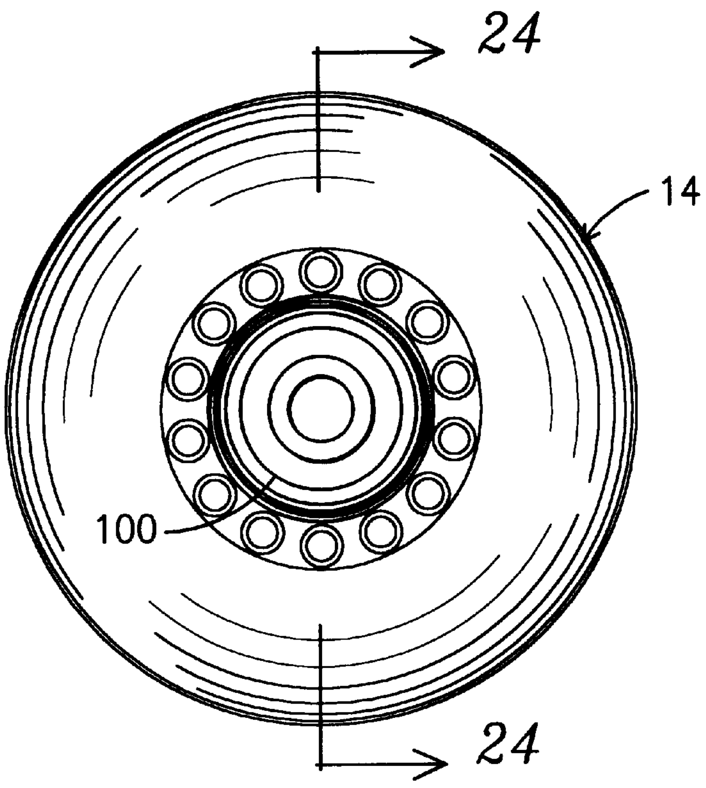
FIG. 23 is a side elevational view of an in-line skate wheel employing a pair of bearing inserts and a separate spacing element.

Referring to FIG. 20, an alternate configuration for the skate bearing insert system is shown. A pair of bearing inserts 100, having a central axial bore 86, are inserted within hub 17 of skate wheel 14. Positioned intermediate the pair of bearing inserts 100 is a self centering spacing element 102. Spacing element 102 has a cylindrical portion 104 and an outer concentric annular ring 106 integrally attached about an outer surface 108 of cylindrical portion 104 at a generally middle portion. Referring to FIG. 22, an annular inner groove 54 is formed within a spacing element central axial bore 110 along an inner circumference 112 of spacing element 102. Spacing element central axial bore 110 and bearing insert central axial bore 86 have a generally equal diameter.

Figure 24:
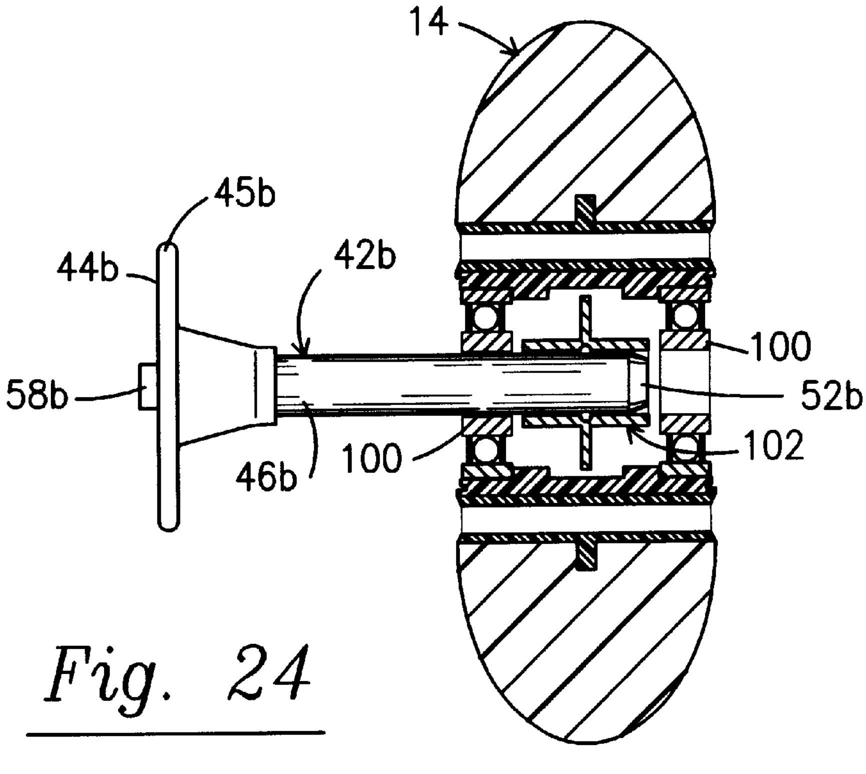
FIG. 24 is a cross sectional view of the in-line skate wheel employing a pair of bearing inserts and a separate spacing element with a bearing insert tool engaging the spacing element along lines 24—24 of FIG. 23.
Figure 25:
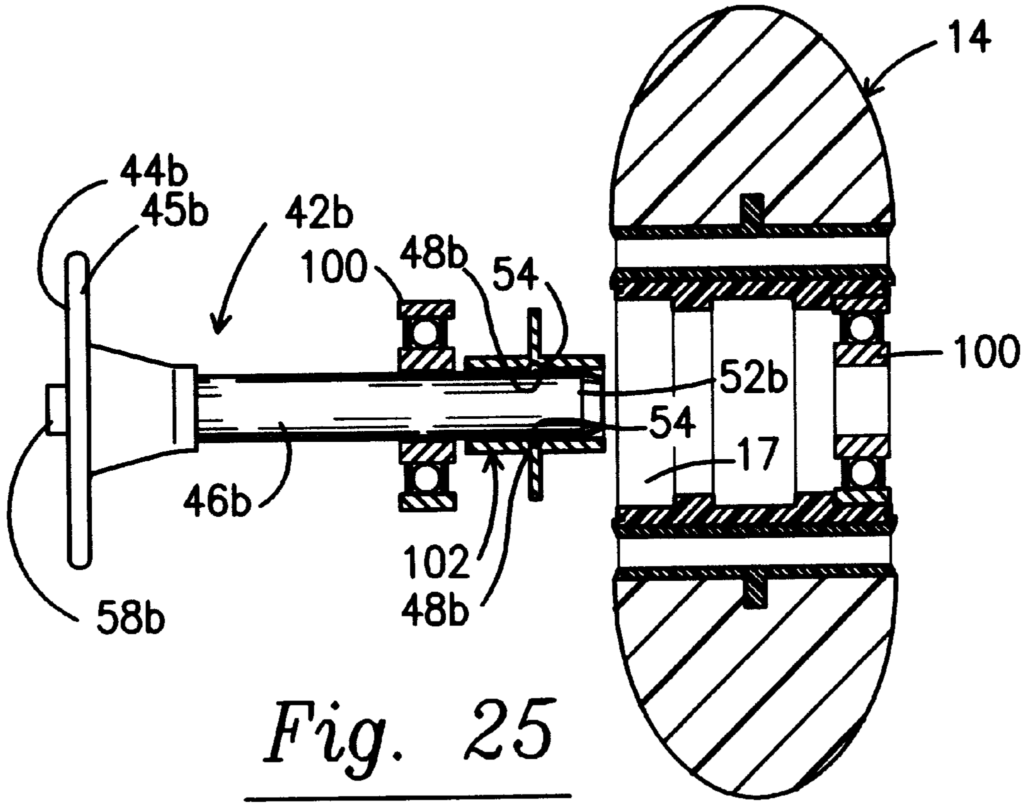
FIG. 25 is a cross sectional view of the in-line skate wheel employing a pair of bearing inserts and a separate spacing element with a bearing insert tool engaging and removing the spacing element and one of the bearing inserts from the skate wheel hub along lines 24—24 of FIG. 23.

Referring to FIGS. 24 and 25, a bearing insert tool 42*b* is employed to remove and insert bearing inserts 100 and spacing element 102. Bearing insert tool 42*b* has a head portion 44*b*, a shaft 46*b*, a pair of retractable nipples 48*b* located at a first distal end 52*b* to head portion 44*b*, a spring (not shown) enclosed within shaft 46*b*, a spring activation button 58*b* located in head portion 44*b*, and a finger grip portion 45*b* located proximal to head portion 44*b*.

Figure 9:
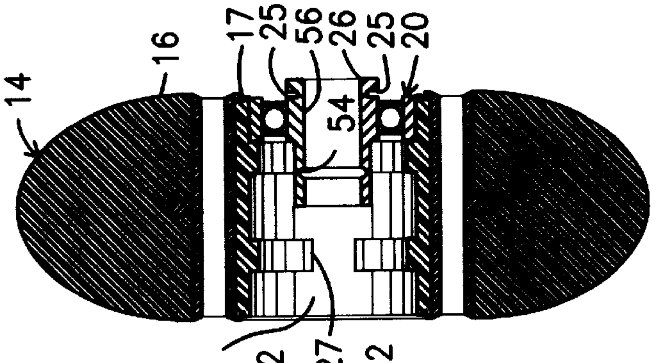
FIG. 9 is a sectional view of an in-line skate wheel along lines 8—8 of FIG. 7 with the bearing insert tool removing a bearing insert from an in-line skate wheel, the bearing insert; having an integral extension of a second axial end.
Figure 7:
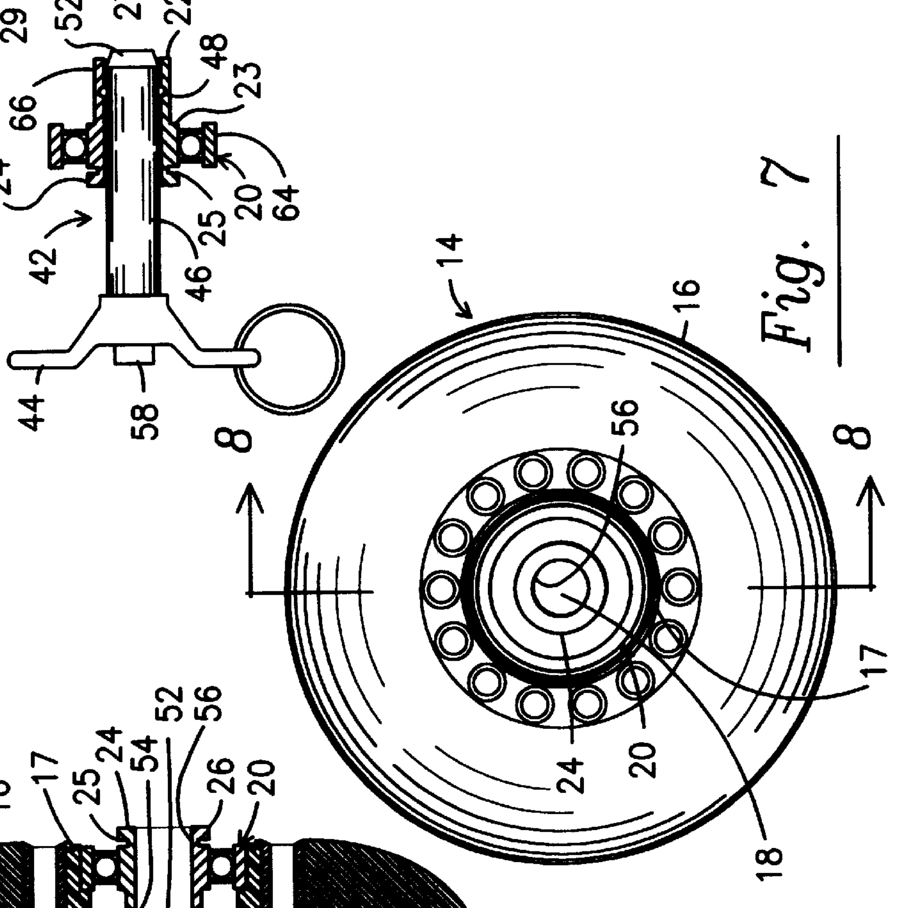
FIG. 7 is a side elevational view of an in-line skate wheel with the bearing inserts in place.

An alternate bearing insert tool 42 is shown in FIGS. 8 and 9. Alternate bearing insert tool 42 has a head portion 44, a shaft 46, nipples 48 located at a first distal end 52 to head portion 44, a spring (not shown) enclosed within shaft 46, and a spring activation button 58 located in head portion 44. The removal, cleaning, and insertion process utilizing alternate bearing insert tool 42 or 42*b* is identical to bearing insert tool 42*a*, except that the individual positions at least two fingers under head portion 44 or 44*b*, respectively, to remove bearing insert 20 or 100 instead of positioning at least two fingers on finger grip 45 of bearing insert tool 42*a*. To insert bearing insert 20 or 100 into skate wheel 14 not utilizing bearing insert tool 42, 42*a*, or 42*b*, a thumb of the individual is used to push bearing insert 20 or 100 into hub 17 of skate wheel 14. Nothing contained herein limits the use of bearing insert tool 42, 42*a*, or 42*b* with bearing insert 100 or bearing insert 20.

In practicing the method of the present invention, an individual utilizes a bearing insert tool as described above (tools 42, 42*a*, or 42*b*). For purposes of illustrating the method, tool 42*b* will used. Referring to FIGS. 24 and 25, button 58*b* of tool 42*b* is depressed. The spring (not shown), enclosed within shaft 46*b*, communicates with nipples 48*b* thereby retracting them. Shaft 46*b* is inserted within central axial bore 86 of bearing insert 100. Thereafter, button 58*b* is released allowing nipples 48*b* to return to a relaxed state causing them to protrude from shaft 46*b* and to engage with annular inner groove 54. Once engagement has occurred, outwardly exerted force is applied thereby removing spacing element 102 and one of the bearing inserts 100, as shown in FIG. 25. The other bearing insert 100 may then be poked out with either distal end 52*b* of tool 42*b* or with the individuals finger. Insertion of bearing insert 100 can be accomplished in one manner by pushing one of the bearing inserts 100 into hub 17, dropping self centering spacing element 102 into hub 17 such that spacing element central axial bore 110 is aligned with bearing insert central axial bore 86, and then pushing the other bearing insert 100 into hub 17 on the opposed side. Insertion can also be accomplished by utilizing one of the bearing insert tools (42, 42*a*, or 42*b*) engaging inner groove 54 of either spacing element 102 or bearing 20.

Figure 26:
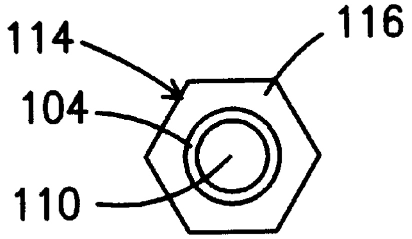
FIG. 26 is a perspective view of an alternate configuration for the spacing element employed in the method of the present invention.

Referring to FIG. 26, an alternate spacing element 114 is shown. Spacing element 114 has the same inner groove 54 as spacing element 102 (although not shown). Spacing element 114 achieves the same result as spacing element 102 in the same manner. Spacing element 114 has a concentric six sided ring 116 integrally mounted about an outer surface 108 of a cylindrical portion 104. Referring to FIG. 24, it is shown how both spacing element 102 or 114 is positioned within hub 17 of skate wheel 14 so as not to cause friction against the inner wall of hub 17.

Figure 2:
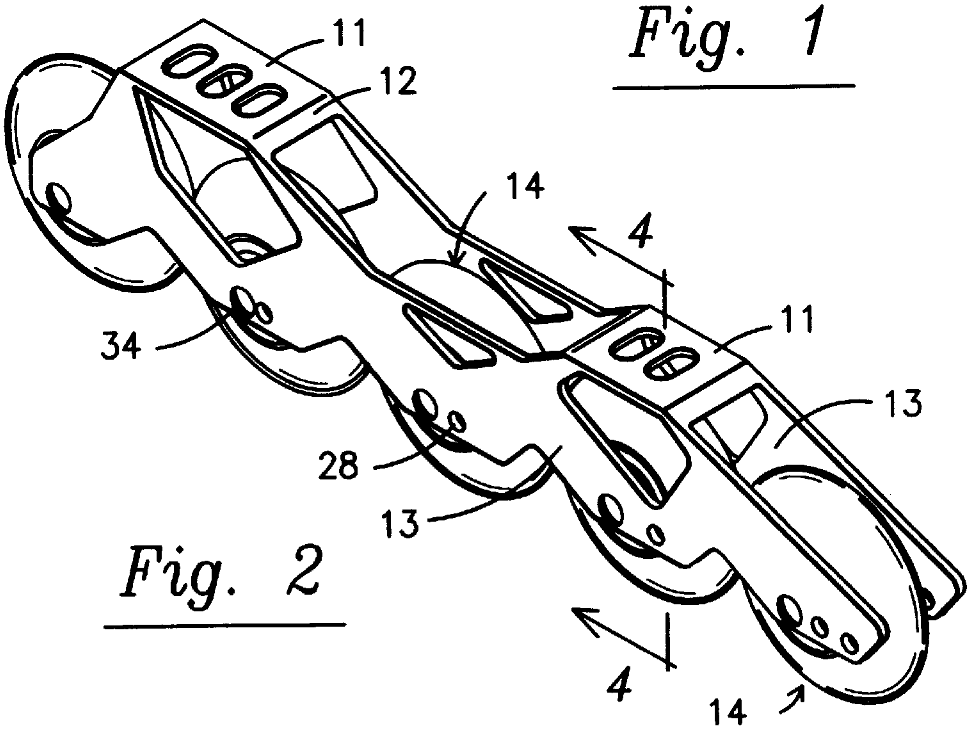
FIG. 2 is a perspective view of the in-line skate housing with five mounted wheels.

Bearing insert 20 or 100 can be used with an in-line skate 9 of the following description. A skate boot 10 is attached by conventional means to horizontal top plane 11 of a skate housing assembly 12 as shown in FIG. 1. A single row of skate wheels 14 are aligned along an undercarriage of skate housing 12 as shown in FIG. 2. The row of skate wheels 14 are bolted to identical skirts 13 descending from opposite longitudinal side edges of top plane 11 as shown in FIG. 2.

Skate wheel 14 consists of a circular polymer member 16, a mounting hub 17, and wheel axial bore 18 manufactured to receive a pair of bearing inserts 20 as shown in FIG. 3 (or bearing inserts 100 as shown in FIG. 20). When utilizing a pair of bearing inserts 20, each can be pressed into opposite sides of wheel axial bore 18. The pair of bearing inserts 20 abut at second axial end 22 of inner race 66 of each bearing insert 20 in a middle portion 19 of wheel axial bore 18 as shown in FIGS. 4, 5, 8, and 12. Flange 24 protrudes from first axial end 26 of each bearing insert 20 as shown in FIGS. 3 and 6. A ridge 27 on an inner surface 29 of mounting hub 17 provides a stop for an inner edge 23 at second axial end 22 of inner race 66 of bearing insert 20 as shown in FIG. 3.

Each descending skirt 13 of skate housing 12 contains a plurality of transverse bores 28 located along the longitudinal side plane of skate housing 12 as shown in FIG. 3. Each transverse bore 28 has a corresponding wheel alignment pocket 30 located on the inside surface of descending skirt 13 of skate housing 12 along the longitudinal plane as shown in FIG. 6.

Figure 4:
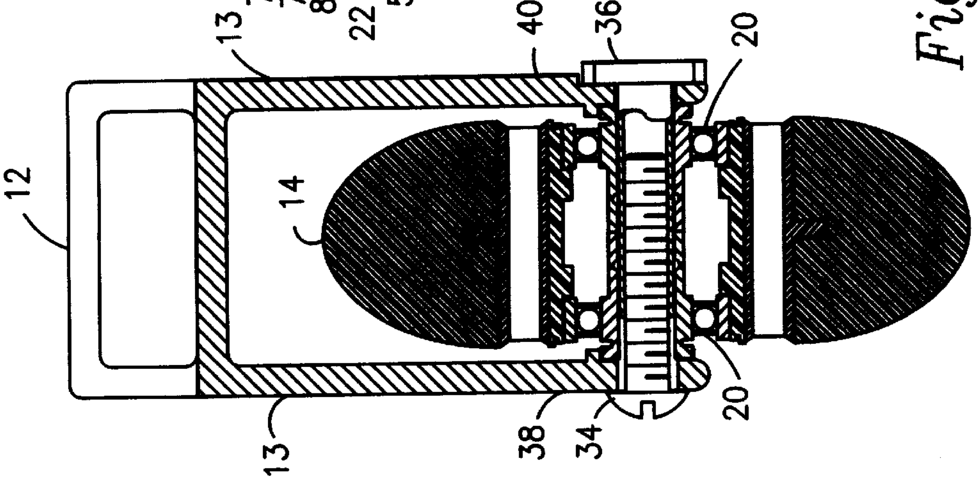
FIG. 4 is a sectional view of the in-line skate housing with a mounted wheel in a pocket along lines 4—4 of FIG. 2 with a bolt inserted.

Flange 24 of first axial end 26 of inner race 66 of bearing insert 20 engages with pocket 30, as shown in FIG. 6, to align wheel 14. A bolt 34 axially aligns transverse bore 28 at a first side 38 on frame skirt 13 with bearing insert 20 as shown in FIGS. 4 and 5. Bolt 34 is received by a female hex nut 36 inserted transversely from a second side 40 on the frame skirt 13 as shown in FIGS. 4 and 5.

Different skate wheels 14 of varying diameters and number may be substituted in skate housing 12. Skate housing 12 may accommodate 3 to 5 skate wheels 14 with diameters ranging from 76 mm to 82 mm.

Skate frame housing 12 is generally made from a strong lightweight metal such as aluminum or titanium, but also could be constructed with a high strength polymer. Bolt 34 is generally made from stainless steel. Circular member 16 and hub 17 of skate wheel 14 are generally made from a hard polymer.

Bearing insert 20 or 100 may be used with an in-line skate 9 of different description than described above. Additionally, Bearing insert 20 (or 100) can be used with a roller skate wheel 60 as shown in FIG. 18 or a skateboard wheel 62 as shown in FIG. 19.

Equivalent mechanical devices can be substituted for the ones set forth above to achieve the same results in the same manner.

What is claimed is:

1. A method of removing a bearing insert from a hub of a skate wheel, comprising the steps of:

providing a tool having a cylindrical wall defining a hollow shaft with first and second ends, a set of retractable nipples located within the hollow shaft at the second end and extending transversely through the cylindrical wall, a means for retracting the set of nipples transversely into the hollow shaft, and a means for activating the means for retracting;

providing a bearing insert mounted within a hub of a skate wheel, wherein the bearing, insert includes a cylindrical outer race, a cylindrical inner race concentrically arranged with respect to the outer race and having a central axial bore having a diameter, and a set of ball bearings located between the outer race and the inner race;

providing a tubular element extending from an end of said bearing insert, wherein the tubular element has an inner circumferential wall that defines a central axial bore that is coaxially aligned with the central axial bore of the inner race and is of generally the same diameter as that of the central axial bore of the inner race, and also has a means along the inner circumferential wall for receiving the set of nipples;

applying a force to said means for activating, thereby forcing said means for activating into the first end of said hollow shaft, thereby activating said means for retracting, and thereby causing said set of nipples to be retracted transversely into said hollow shaft; then with said set of nipples retracted into said hollow shaft, inserting said cylindrical wall into and through the central axial bore of said bearing insert and then into the central axial bore of said tubular element; then releasing the force from said means for activating, thereby causing said means for retracting to force said means for activating from the first end of said shaft, and also causing said set of nipples to transversely extend through said cylindrical wall and into engagement with said means for receiving; and then with said set of nipples engaged with said means for receiving, applying a pulling force to said cylindrical wall, thereby pulling said bearing insert out of said hub followed by said tubular element.

2. A method of removing a bearing insert from a hub of a skate wheel according to claim 1, wherein the means along the inner circumferential wall for receiving the nipples of the tool is an annular groove formed along the inner cirumferential wall.

3. The method according to claim 1, wherein the means for retracting the nipples is a spring enclosed within the hollow shaft, and wherein the step of activating the means for retracting includes compressing said spring within said hollow shaft.

4. The method according to claim 1, wherein the means for activating the means for retracting is a button located at the first end, and wherein the step of forcing the means for activating into the first end of the hollow shaft includes forcing said button into said hollow shaft.

5. The method according to claim 3, wherein the means for activating the means for retracting is a button located at the first end, and wherein the step of compressing the spring within the hollow shaft includes forcing said button into the hollow shaft against said spring.

6. A method of removing a bearing insert from a hub of a skate wheel, the steps comprising:

a) providing a bearing insert mounted within a hub of a skate wheel wherein the bearing insert includes a cylindrical outer race, a cylindrical inner race concentrically arranged with respect to the outer race and having a central axial bore having a diameter, and a set of ball bearings located between the outer and inner races, b) providing a tool having a cylindrical wall defining a hollow shaft, the tool having a head portion, a set of retractable nipples located at a distal end of the shaft from the head portion, a spring enclosed within the shaft, and a depressible button located at the head portion communicating with the spring for retracting the nipples within the shaft and returning the nipples to a relaxed state such that they protrude from the shaft, c) providing a tubular element extending from an end of the bearing insert, wherein the tubular element has an inner circumferential wall that defines a central axial bore that is coaxially aligned with the central axial bore of the inner race and is of generally the same diameter as that of the central bore of the inner race, d) providing an annular groove along the inner circumferential wall, e) depressing the button of the tool such that the spring is constricted causing the nipples to be drawn inwardly within the shaft, f) after said depressing step, inserting the cylindrical wall of the tool within the central axial bore of the bearing insert, g) after said inserting step, releasing the button such that the spring returns to a relaxed state causing the nipples to protrude outwardly from the shaft of the tool, h) during said releasing step, positioning the cylindrical wall such that the annular groove receives the protruding nipples, and i) after said releasing and positioning steps, exerting force upon the tool in an outwardly axial direction such that the tool removes the bearing insert from the hub.

7. A method of removing and inserting a bearing insert from a hub of a skate wheel, the steps comprising, a) providing a bearing insert mounted within the hub of a skate, the bearing insert including a cylindrical outer race, a cylindrical inner race concentrically arranged with respect to the outer race and having a central axial bore with a diameter, and a set of ball bearings located between the outer and inner races, b) providing a tubular element extending from an end of the bearing insert, wherein the tubular element has an inner circumferential wall that defines a central axis bore that is coaxially aligned with the central bore of the inner race and is generally of the same diameter as that of the central axial bore of the inner race, and also has an annular groove along the inner circumferential wall for receiving a set of nipples, c) providing a tool having a cylindrical wall defining a hollow shaft, the tool having a head portion, the shaft having retractable nipples located at a first distal end from the head portion, a spring enclosed within the shaft, a spring activation button located in the head portion, and a finger grip portion located about the cylindrical wall;

d) depressing the spring activation button such that the spring becomes compressed causing the nipples to retract into the shaft, e) after said depressing step, inserting the cylindrical wall of the tool into the central axial bore of the bearing insert with the nipples retracted, f) after said inserting step, releasing the spring activation button such that the spring returns to a relaxed state causing the nipples to protude from the shaft and engage with the annular groove, g) after said releasing step, positioning at least two fingers under the finger grip portion of the tool, h) after said positioning step, pulling the tool with the engaged tabular element in an axial direction away from the skate wheel thereby removing the bearing insert from the hub of the skate wheel, i) after said pulling step, inserting the tabular element into the hub of the skate wheel with the tool engaged with the bearing insert, j) after said inserting step recited in subparagraph h), applying force to an outer surface of the bearing insert, thereby securing the bearing insert within the hub of the skate wheel, k) after said applying step, depressing the spring activation button such that the spring becomes compressed causing the nipples to retract from the annular groove with the shaft, and l) after said depressing step recited in subparagraph j), pulling on the bearing insert too in an axial direction away from the skate wheel, thereby removing the cylindrical wall of the tool from the central axial bore of the bearing insert.

8. The method according to claim 7, wherein the finger grip portion is slidable along the cylindrical wall and has a crown portion and a distal end of a diameter that corresponds to the diameter of the outer circumference of the outer race, and wherein the securing step recited in subparagraph j) includes:

positioning the distal end over the outer race;

positioning at least two fingers on the finger grip portion; and then pushing the distal end against the outer race in an axial direction towards the skate wheel.

* * * * *